(12) United States Patent
Fuchigami

(10) Patent No.: US 9,367,907 B2
(45) Date of Patent: Jun. 14, 2016

(54) FLICKER REDUCING DEVICE, IMAGING DEVICE, AND FLICKER REDUCING METHOD

(71) Applicant: PANASONIC INTELLECTUAL PROPERTY CORPORATION OF AMERICA, Torrance, CA (US)

(72) Inventor: Ikuo Fuchigami, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 29 days.

(21) Appl. No.: 14/407,365

(22) PCT Filed: Apr. 11, 2014

(86) PCT No.: PCT/JP2014/002087
§ 371 (c)(1),
(2) Date: Dec. 11, 2014

(87) PCT Pub. No.: WO2014/167865
PCT Pub. Date: Oct. 16, 2014

(65) Prior Publication Data
US 2015/0146998 A1 May 28, 2015

(30) Foreign Application Priority Data
Apr. 12, 2013 (JP) ................................. 2013-083529

(51) Int. Cl.
*G06K 9/40* (2006.01)
*G06T 5/50* (2006.01)
(Continued)

(52) U.S. Cl.
CPC ... *G06T 5/50* (2013.01); *G06T 5/10* (2013.01); *G06T 7/0022* (2013.01); *H04N 5/2357* (2013.01); *H04N 5/3532* (2013.01); *G06T 2207/20056* (2013.01)

(58) Field of Classification Search
None
See application file for complete search history.

(56) References Cited

U.S. PATENT DOCUMENTS 6,025,913 A * 2/2000 Curbelo ................. G01J 3/447
250/339.08
6,710,818 B1 * 3/2004 Kasahara ............... H04N 5/235
348/226.1
(Continued)

FOREIGN PATENT DOCUMENTS

JP 2001-111887 A 4/2001
JP 2007-028573 A 2/2007
(Continued)

OTHER PUBLICATIONS

International Search Report for corresponding International Application No. PCT/JP2014/002087 mailed Jul. 1, 2014.

*Primary Examiner* — Feng Niu
(74) *Attorney, Agent, or Firm* — Renner, Otto, Boisselle & Sklar, LLP

(57) ABSTRACT

This flicker reducing apparatus (200) includes: a line integral value getting section (210) which gets, based on values of pixels included in ones selected from a plurality of horizontal lines that form an image, line integral values of the selected horizontal lines with respect to each image; a discrete Fourier transform section (230) which performs, between the newest image and a number of other images gotten earlier than the newest one, a discrete Fourier transform on a sequence of the line integral values of the respective images; a linear approximation section (250) which obtains an approximation line based on phase information that has been collected as a result of the discrete Fourier transform and which extracts information about the flicker from the approximation line; a flicker coefficient calculating section (260) which calculates a flicker coefficient by reference to the flicker information; and a correction arithmetic section (270) which performs flicker reduction processing on the image signal using the flicker coefficient.

11 Claims, 4 Drawing Sheets

(51) Int. Cl.
  *H04N 5/235* (2006.01)
  *H04N 5/353* (2011.01)
  *G06T 5/10* (2006.01)
  *G06T 7/00* (2006.01)

(56) References Cited

U.S. PATENT DOCUMENTS

| | | | | |
|---|---|---|---|---|
| 7,164,439 B2 * | 1/2007 | Yoshida | ............... | H04N 5/235 348/222.1 |
| 7,277,127 B2 * | 10/2007 | Voronov | ............... | H04N 5/235 250/214 C |
| 7,639,285 B2 * | 12/2009 | Nomura | ............... | H04N 5/2357 348/228.1 |
| 7,656,436 B2 * | 2/2010 | Kinoshita | ............ | H04N 5/2357 348/222.1 |
| 7,705,893 B2 * | 4/2010 | Kinoshita | ............ | H04N 5/2357 348/222.1 |
| 7,995,112 B2 * | 8/2011 | Kinoshita | ............. | H04N 5/235 348/222.1 |
| 8,115,828 B2 * | 2/2012 | Mikami | ................. | H04N 5/235 348/226.1 |
| 8,243,165 B2 * | 8/2012 | Fujiwara | .............. | H04N 5/2351 348/228.1 |
| 8,451,345 B2 * | 5/2013 | Fuchigami | ............. | H04N 5/243 348/222.1 |
| 9,055,228 B2 * | 6/2015 | Kinoshita | ............ | H04N 5/2353 |
| 2006/0055823 A1 | 3/2006 | Kinoshita et al. | | |
| 2007/0013785 A1 | 1/2007 | Kinoshita et al. | | |
| 2007/0046790 A1 | 3/2007 | Nakasuji et al. | | |
| 2011/0205394 A1 | 8/2011 | Fuchigami | | |

FOREIGN PATENT DOCUMENTS

| | | |
|---|---|---|
| JP | 2007-158964 A | 6/2007 |
| JP | 2013-017238 A | 1/2013 |
| WO | WO 2010/058567 A1 | 5/2010 |

* cited by examiner

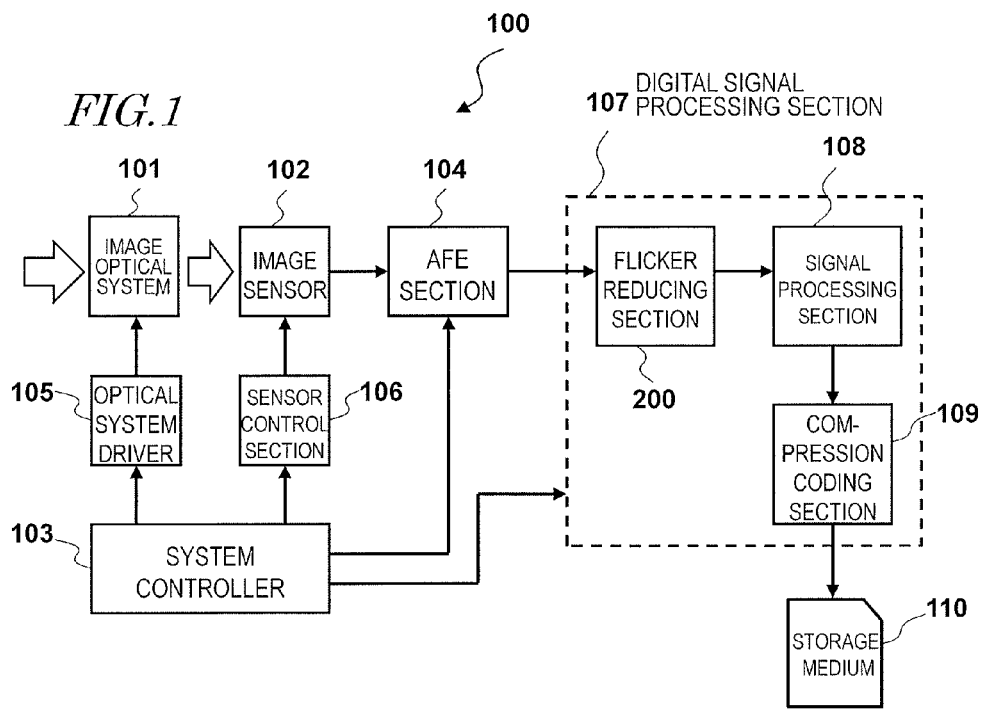
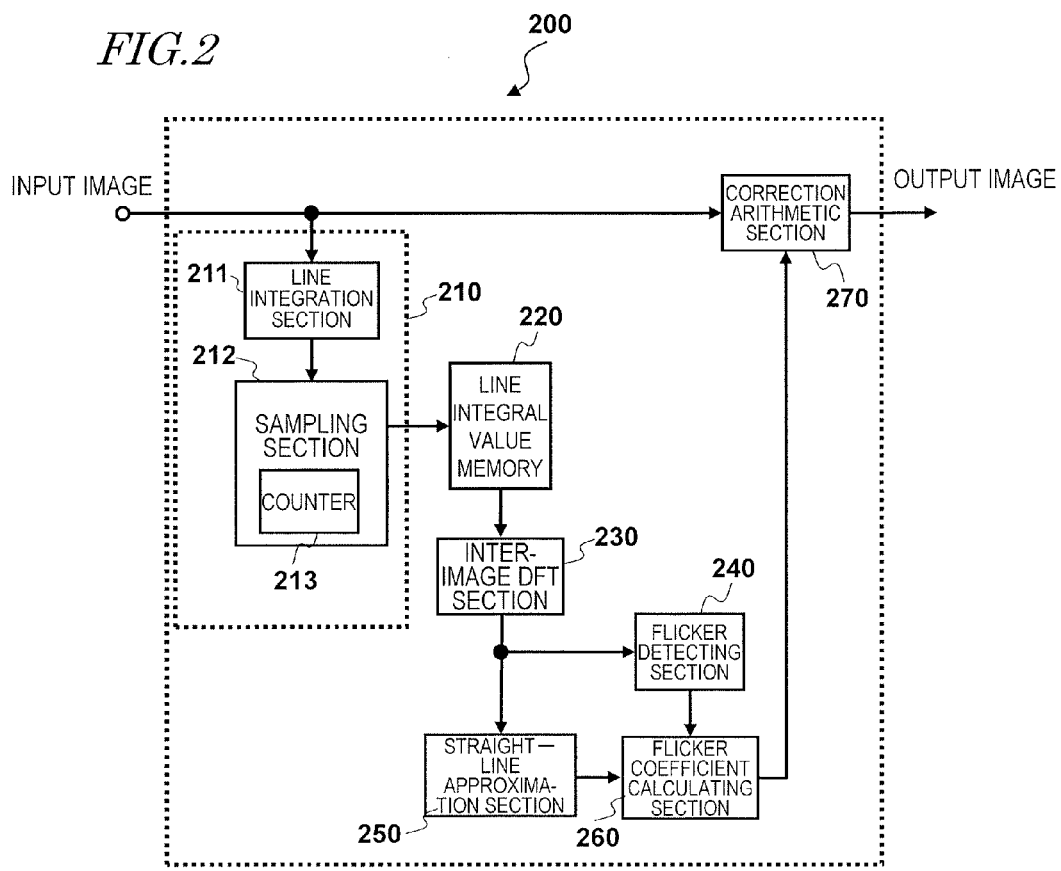

FLICKER REDUCING DEVICE, IMAGING DEVICE, AND FLICKER REDUCING METHOD

TECHNICAL FIELD

The present application relates to a technique for relieving an image signal representing an image shot of flicker which has been produced as bright and dark portions in the image shot due to illumination's flickering. More particularly, the present application relates to a technique for either removing or reducing flicker to be produced when an image sensor which captures an image by line exposure such as a CMOS image sensor, for example, is used from an image signal representing the image captured.

BACKGROUND ART

When video is shot under an environment illuminated with a (non-inverter) fluorescent lamp, the luminance signal varies due to the AC voltage frequency of the fluorescent lamp (at 50 Hz or 60 Hz), thus producing bright and dark portions in an image shot. Such a phenomenon is generally called "flicker". In the field of such a flicker reducing technique, the technique disclosed in Patent Document No. 1 is known, for example.

The image capture device disclosed in Patent Document No. 1 stores, in a memory, as many line integral values as the number of frames corresponding to the greatest common divisor of the flicker period and frame period. In this case, each of the line integral values is obtained by calculating the integral of pixel values on a horizontal line basis within a frame. Among multiple frames, the line integral values are normalized based on the average of the line integral values of associated horizontal lines. And based on that normalized line integral value, flicker is analyzed.

FIG. 6 illustrates a configuration for a main part of a flicker reducing section (which is also called "flicker reducing means") provided for a conventional image capture device. The configuration of the flicker reducing section of the image capture device disclosed in Patent Document No. 1 can be described with reference to FIG. 6.

In FIG. 6, a line integration section 11 receives image signals which have been input to this flicker reducing section 11 and calculates a line integral value of the image signals for a single horizontal line on a line-by-line basis. A sampling section 12 extracts a line integral value associated with a predetermined line from the line integral values supplied from the line integration section 11. A line integral value memory 13 stores the line integral value that has been extracted by the sampling section 12 for a predetermined number of frames (or fields). In the following description, the line integral value memory 13 is supposed to store the line integral value for a predetermined number of frames.

A difference calculating section 51 calculates the difference (i.e., an inter-frame difference) between a first line integral value supplied from the sampling section 12 and a second line integral value retrieved from the line integral value memory 13. In this case, the "second line integral value" refers herein to the line integral value of a horizontal line, which is located at the same coordinates as a horizontal line where the first line integral value has been obtained, within the previous frame that is stored in the line integral value memory 13.

An average value calculating section 52 calculates the average value of the line integral values based on the first line integral value and the line integral values of multiple frames which have been obtained earlier than the latest one from a horizontal line that is located at the same coordinates as the horizontal line where the first line integral value has been obtained. A normalizing section 53 divides the inter-frame difference obtained by the difference calculating section 51 by the average line integral value obtained by the average value calculating section 52, thereby calculating a normalized difference value in which the inter-frame difference has been normalized.

An interline DFT (discrete Fourier transform) section 54 performs a discrete Fourier transform on the normalized differential value that has been obtained by the normalizing section 53. A flicker coefficient section 17 determines the amplitudes and phases of respective degrees of flicker components based on the Fourier transform coefficient obtained by the interline DFT section 54. And based on those amplitudes and phases, the flicker coefficient section 17 generates a flicker coefficient associated with the pixel value which is currently input to this flicker reducing section. Based on the flicker coefficient that has been generated by the flicker coefficient section 17, a correction arithmetic section 18 corrects the input image entered into this flicker reducing section 1. Specifically, the correction arithmetic section 18 removes flicker by dividing the input pixel value by the flicker coefficient plus one.

CITATION LIST

Patent Literature

Patent Document No. 1: Japanese Laid-Open Patent Publication No. 2007-028573

SUMMARY OF INVENTION

Technical Problem

However, according to the conventional technique described above, the flicker detection accuracy achieved still needs to be improved and the memory space to use still needs to be reduced.

A non-limiting exemplary embodiment of the present application provides a flicker reducing apparatus which can improve the flicker detection accuracy and which can save the memory space to use.

Solution to Problem

To overcome the problem described above, an aspect of the present invention provides a flicker reducing apparatus which reduces flicker caused by illumination from an image signal which has been generated by an image sensor and which has the flicker. The apparatus includes: a line integral value getting section which gets, based on values of pixels included in ones selected from a plurality of horizontal lines that form an image, line integral values of the selected horizontal lines with respect to each image; a discrete Fourier transform section which performs, between the newest image and a number of other images gotten earlier than the newest one, a discrete Fourier transform on a sequence of the line integral values of the respective images; a linear approximation section which obtains an approximation line based on phase information that has been collected as a result of the discrete Fourier transform and which extracts information about the flicker from the approximation line; a flicker coefficient calculating section which calculates a flicker coefficient by reference to the flicker information; and a correction arithmetic section which performs flicker reduction processing on the image signal using the flicker coefficient.

This general and particular aspect can be implemented as a system, a method and a computer program or a combination thereof.

Advantageous Effects of Invention

A flicker reducing apparatus according to an aspect of the present invention can detect flicker more accurately and can reduce the memory space to use.

BRIEF DESCRIPTION OF DRAWINGS

FIG. 1 is a block diagram illustrating a configuration for an image capture device 100 as a first exemplary embodiment.

FIG. 2 is a block diagram illustrating a configuration for a flicker reducing section 200 according to the first exemplary embodiment.

Figure 5:
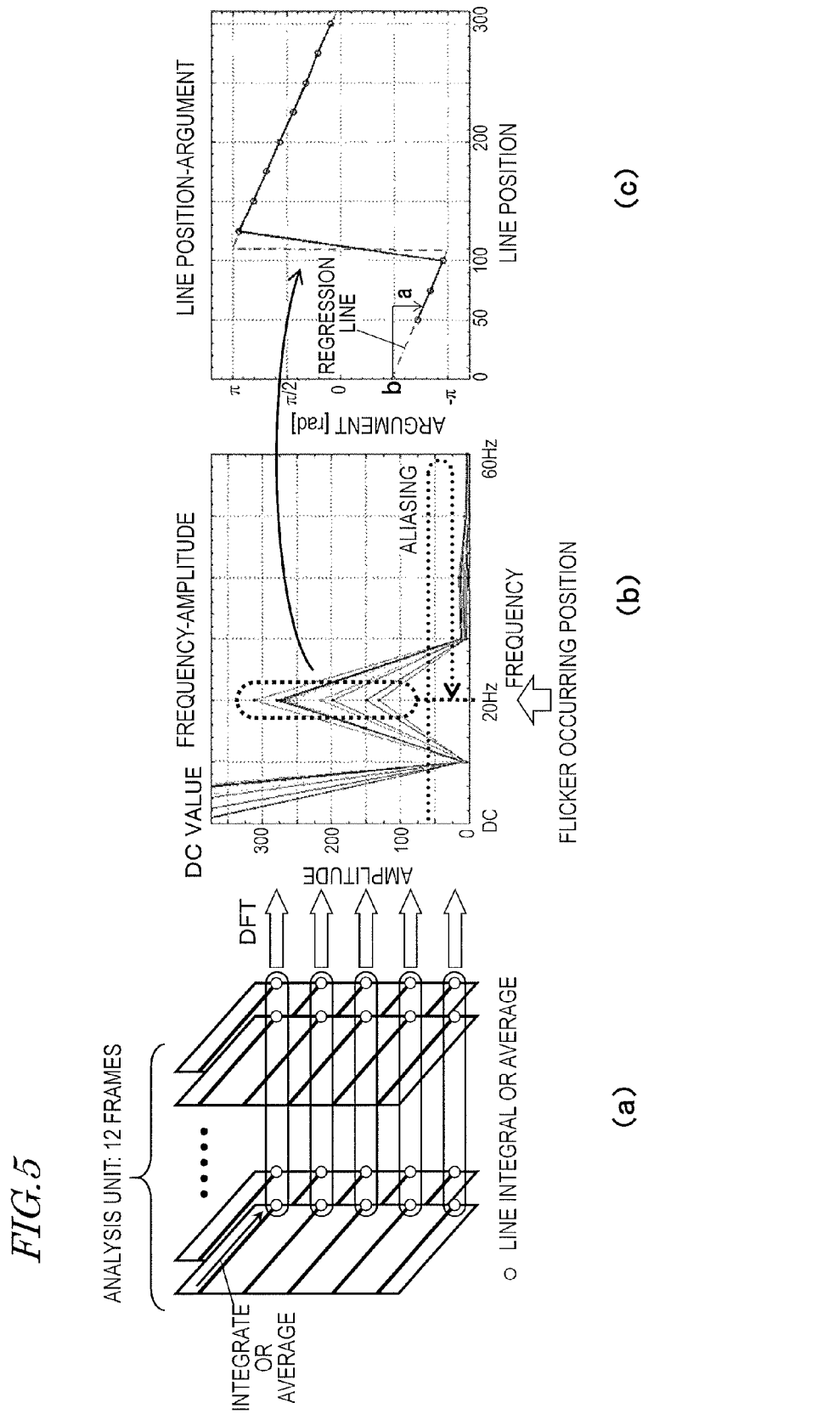

Portion (a) of FIG. 5 illustrates how a discrete Fourier transform is performed on a sequence of line integral values associated with each selected line number. Portion (b) of FIG. 5 shows an exemplary frequency-amplitude characteristic obtained through DFT when the frame rate is 120 fps and the flicker frequency is 100 Hz. Portion (c) of FIG. 5 shows a relation between the argument of the DFT coefficient at the frequency (of 20 Hz) at which the flicker occurs and the vertical coordinate of a horizontal line in a frame.

Figure 6:
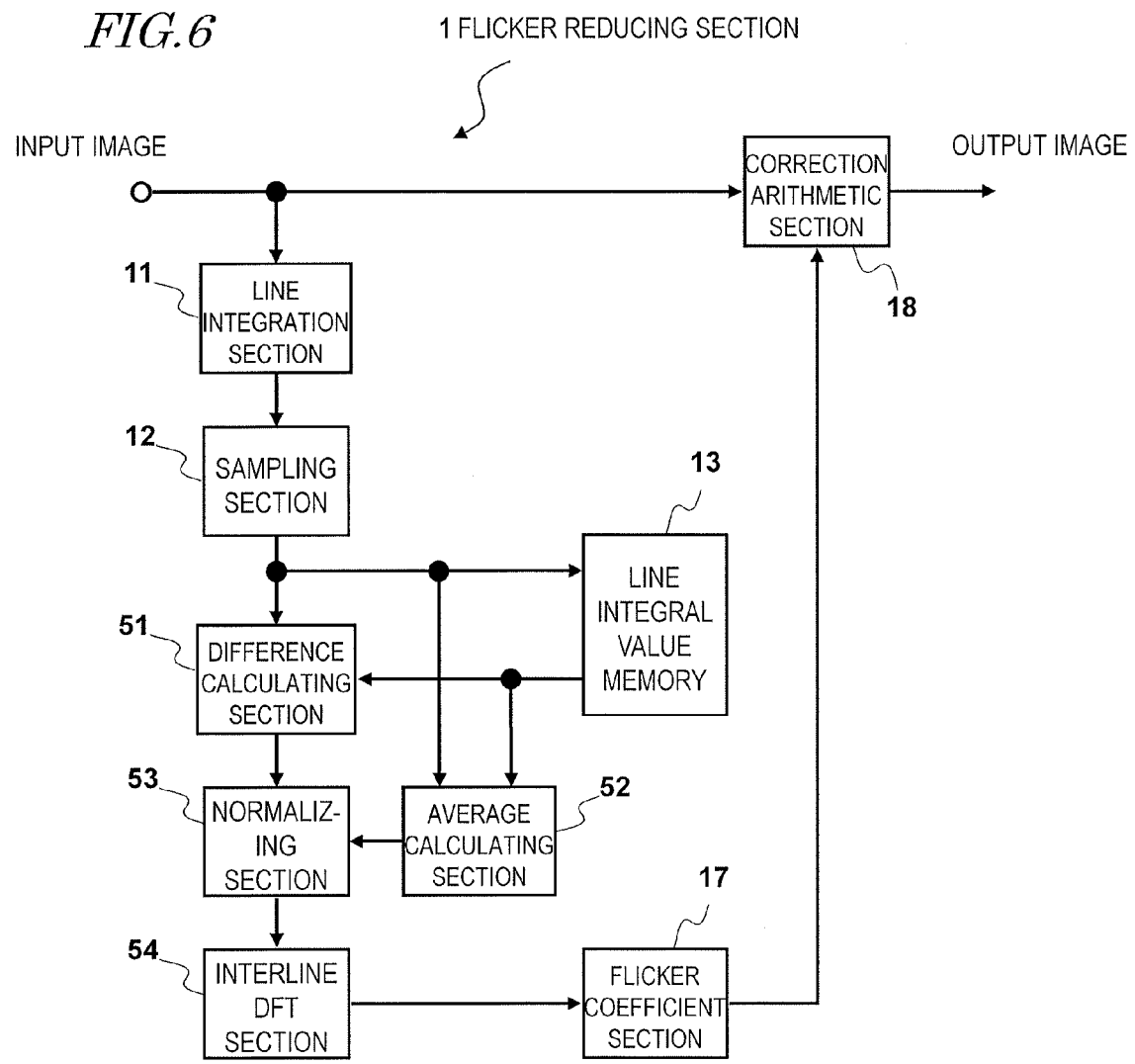

FIG. 6 is a block diagram illustrating a configuration for a conventional flicker reducing section.

DESCRIPTION OF EMBODIMENTS

First of all, the problem the present inventors studied will be described.

As described above, if the flicker frequency is 100 Hz and the frame rate is 60 fps, for example, the frequency to be the greatest common divisor will be 20 Hz. Thus, the number of frames that need to be used to calculate the average value of line integral values is three.

Supposing a shooting session is going to be carried out at a high frame rate, if the frame rate is 240 fps, for example, the greatest common divisor between the flicker period and the frame period is 20 Hz. However, the number of frames that need to be used to calculate the average value of line integral values becomes twelve, which is larger than in a situation where the frame rate is 60 fps. As can be seen, when a shooting session is going to be carried out at a high frame rate, information about a huge number of frames needs to be stored in the memory depending on the frame rate, and therefore, a lot more memory space needs to be used, which is a problem.

Also, as image sensors use increasing numbers of pixels recently, the number of horizontal lines that form one frame has also been on the rise, thus further increasing the number of line integral values to be stored in the memory. As a result, even more memory space needs to be used, which is also a problem.

Such a problem can be avoided if the frame rate is defined to be an integral number of times as high as 100 fps. In that case, however, the number of frame rate options decreases.

It is also possible to make a cut at an appropriate number of frames and calculate the average value of line integral values based on only those frames obtained. However, such a method works only when the amplitude of the flicker is much smaller than the average value of the line integral values. If a shooting session is going to be carried out at a high frame rate when the exposure time becomes shorter, the amplitude of the flicker is greater than the average value of the line integral values, and therefore, that method will not work fine.

When a shooting session is carried out at a high frame rate, one flicker period is sometimes longer than one frame period. In that case, if the frame rate described above is 240 fps as in the example described above, one flicker period corresponds to 2.4 frame periods. In this case, since there is a blanking interval between frames, no images can be gotten and no line integral values can be obtained, either, during that interval. As a result, part of the data sequence to be analyzed will be missing in the inter-line DFT section 54. The missing part can be certainly obtained by making interpolation on neighboring data, but the accuracy of analysis does decline even in that case.

The data sequence to be supplied to the inter-line DFT section 54 suitably has equal intervals. In that case, the sampling section 12 extracts line integral values corresponding to horizontal lines with equal intervals. However, if there is a low luminance portion (i.e., a portion with a low pixel signal level) in an image to decrease the line integral value, then the line integral value will be affected by noise significantly. As a result, the accuracy of the normalized differential value decreases, which is a problem. In addition, since the image signal gets saturated at a portion with high luminance (i.e., a portion with a high pixel signal level), it is difficult to avoid getting the flicker component distorted.

To overcome these problems with the related art, the present inventors invented a flicker reducing apparatus with a novel configuration. An aspect of the present invention can be outlined as follows.

A flicker reducing apparatus according to an aspect of the present invention reduces flicker caused by illumination from an image signal which has been generated by an image sensor and which has the flicker. The apparatus includes: a line integral value getting section which gets, based on values of pixels included in ones selected from a plurality of horizontal lines that form an image, line integral values of the selected horizontal lines with respect to each image; a discrete Fourier transform section which performs, between the newest image and a number of other images gotten earlier than the newest one, a discrete Fourier transform on a sequence of the line integral values of the respective images; a linear approximation section which obtains an approximation line based on phase information that has been collected as a result of the discrete Fourier transform and which extracts information about the flicker from the approximation line; a flicker coefficient calculating section which calculates a flicker coefficient by reference to the flicker information; and a correction arithmetic section which performs flicker reduction processing on the image signal using the flicker coefficient.

In one embodiment, the line integral value getting region may include: a line integration section which calculates, with respect to each image, the line integral value of each of the plurality of horizontal lines that form the image; and a sampling section which extracts first samples from outputs of the line integration section in the descending order of the number of pixels, of which the pixel values satisfy a predetermined condition, so that the first samples have a larger number of such pixels than any other samples and which defines horizontal lines associated with the first samples to be the ones selected from those horizontal lines.

In one embodiment, the line integral value may be either an integral value which is calculated by integrating all pixel values included in each said horizontal line or pixel values that satisfy the predetermined condition or a normalized value which is calculated by normalizing the integral value by the number of pixels included in the horizontal line or the number of pixels, of which the pixel values satisfy the predetermined condition.

In one embodiment, the sampling section may include a counter which counts the number of pixel values that satisfy the predetermined condition, may further extract second samples from the first samples according to a relation between the counter's count and a threshold value, and may define horizontal lines associated with the second samples to be the one selected from the plurality of horizontal lines. And the linear approximation section may extract the flicker information from the horizontal lines associated with the second samples.

In one embodiment, the sampling section may further extract second samples from the first samples according to a motion vector between the images, and may define horizontal lines associated with the second samples to be the one selected from the plurality of horizontal lines. And the linear approximation section may extract the flicker information from the horizontal lines associated with the second samples.

In one embodiment, the discrete Fourier transform section may estimate a candidate frequency at which flicker possibly occurs based on the frequency of a grid power and the frame rate of the image and may perform the discrete Fourier transform on the sequence of line integral values using the candidate frequency.

In one embodiment, the linear approximation section may detect an intercept of the approximation line as the flicker's initial phase, and may detect the flicker's frequency based on the gradient of the approximation line.

In one embodiment, the flicker reducing apparatus may further include a memory which stores the line integral values of multiple images.

In one embodiment, the flicker reducing apparatus may further include a flicker detecting section which determines, based on a result of the discrete Fourier transform, whether or not there is any flicker in the image signal. The flicker detecting section may be configured to: calculate the amplitude at the candidate frequency by reference to amplitude information collected as a result of the discrete Fourier transform; calculate normalized amplitude by dividing the amplitude at the candidate frequency by the amplitude of a DC component of the image; and determine a representative value based on the normalized amplitude associated with the sequence of line integral values, and decide that there be the flicker if the representative value is equal to or greater than a predetermined value or transmit an instruction to stop the flicker reduction processing to the correction arithmetic section if the representative value is less than the predetermined value.

An image capture device according to another aspect of the present invention reduces flicker caused by illumination from an image signal. The device includes: an image sensor which captures a subject image and generates the image signal; a line integral value getting section which gets, based on values of pixels included in ones selected from a plurality of horizontal lines that form an image, line integral values of the selected horizontal lines with respect to each image; a memory which stores the line integral values of multiple images; a discrete Fourier transform section which performs, between the newest image and a number of other images gotten earlier than the newest one, a discrete Fourier transform on a sequence of the line integral values of the respective images; a linear approximation section which obtains an approximation line based on phase information that has been collected as a result of the discrete Fourier transform and which extracts information about the flicker from the approximation line; a flicker coefficient calculating section which calculates a flicker coefficient by reference to the flicker information; and a correction arithmetic section which performs flicker reduction processing on the image signal using the flicker coefficient.

A flicker reducing method according to another aspect of the present invention is a method for relieving an image signal which has been generated by an image sensor of flicker which has been produced in the image signal due to illumination. The method includes the steps of: getting, based on values of pixels included in ones selected from a plurality of horizontal lines that form an image, line integral values of the selected horizontal lines with respect to each image; performing, between the newest image and a number of other images gotten earlier than the newest one, a discrete Fourier transform on a sequence of the line integral values of the respective images; obtaining an approximation line based on phase information that has been collected as a result of the discrete Fourier transform and extracting information about the flicker from the approximation line; calculating a flicker coefficient by reference to the flicker information; and performing flicker reduction processing on the image signal using the flicker coefficient.

According to an aspect of the present invention, even when a shooting session is carried out at a high frame rate, just as many line integral values as samples need to be stored in the memory in an interval between predetermined frames. As a result, a memory of a relatively small size can be used and the memory cost can be cut down. In addition, the flicker frequency and initial phase can be detected more accurately by linear approximation. As a result, the flicker can be detected with the influence of the blanking interval and the low- and high-luminance portions in an image lessened, and therefore, the flicker detection accuracy can be increased.

Embodiments of an image capture device and flicker reducing section (or flicker reducing apparatus) according to the present invention will now be described with reference to the accompanying drawings. In the following description, the "image" may be either a frame or a field. Although the flicker reducing section is supposed herein to perform processing on a frame basis, it may also perform the same processing on a field basis.

Embodiment 1

A first embodiment of the present invention will now be described.

[Configuration of Image Capture Device 100]

An image capture device 100 will be described with reference to FIG. 1.

FIG. 1 is a block diagram illustrating a configuration for an image capture device 100 as a first embodiment. The image capture device 100 shoots a subject image, processes the image shot, and then writes it on a storage medium. The image capture device 100 may be a digital camcorder or a digital still camera, for example.

This image capture device 100 includes an image optical system 101, an image sensor 102, a system controller 103, an AFE (analog front end) section 104, an optical system driver 105, a sensor control section 106, a digital signal processing section 107, and a storage medium 110.

The image optical system 101 has a diaphragm, an optical image stabilizer lens and multiple groups of lenses including a zoom lens and a focus lens. By moving the zoom lens along the optical axis, the subject image can be either zoomed in on or zoomed out. Also, by moving the focus lens along the optical axis, the focus of the subject image can be adjusted. The number of lenses that form this image optical system 101 may be appropriately determined according to the function required.

The image sensor 102 may be a CMOS (complementary metal oxide semiconductor) sensor, for example. The image sensor 102 converts the light being imaged on an image capturing plane by the image optical system 101 into an electrical signal to generate an analog image signal, and then outputs the analog image signal thus generated to the AFE section 104. The image sensor 102 performs line exposure, transfer and various other kinds of operations. The line exposure is also called a "rolling shutter".

The system controller 103 may be implemented as a semiconductor element, for example. The system controller 103 may be implemented as only a set of hardware components or as a combination of hardware components and software. The system controller 103 may be implemented as a microcomputer, for example. And the system controller 103 controls the image capture device 100 in its entirety.

The AFE section 104 includes a correlation double sampling (CDS) circuit, an automatic gain control (AGC) amplifier, and an analog-to-digital converter (ADC). The CDS circuit removes noise from an analog image signal supplied from the image sensor 102. The AGC controls the gain to obtain an image signal at an appropriate level under the control of the system controller 103. The ADC converts the analog image signal supplied from the AGC into a digital image signal. It should be noted that the AFE section 104 is omitted if the image sensor has its function integrated so as to output a digital image signal.

In accordance with the instruction given by the system controller 103, the optical system driver 105 drives the diaphragm, zoom lens and focus lens which are included in the image optical system 101.

In accordance with the instruction given by the system controller 103, the sensor control section 106 controls the image sensor 102.

The digital signal processing section 107 may be implemented as a digital signal processor (DSP), for example, and subjects the digital image signal supplied from the AFE section 104 to digital signal processing, thereby generating an output image file for the image capture device 100. The digital signal processing section 107 includes a flicker reducing section 200, a signal processing section 108 and a compression coding section 109.

The flicker reducing section 200 reduces a flicker component which has been produced due to illumination's flickering as bright and dark portions from the digital image signal supplied from the AFE section 104 in an image that has been shot under an environment illuminated with a fluorescent lamp. A detailed configuration for this flicker reducing section 200 will be described later.

The signal processing section 108 subjects the digital image signal supplied from the flicker reducing section 200 to various kinds of processing such as gamma correction, white balance correction, flaw correction and image format conversion according to the form of the output image.

The compression coding section 109 compresses the digital image signal supplied from the signal processing section 108 in a compression format compliant with the H. 264 standard or the MPEG-2 standard, for example.

The storage medium 110 may be implemented as a flash memory or a ferroelectric memory, for example, and can store data such as an image file generated by the digital signal processing section 107.

[Configuration for Flicker Reducing Section 200]

A block configuration for the flicker reducing section 200 will be described with reference to FIG. 2.

FIG. 2 is a block diagram illustrating a configuration for the flicker reducing section 200 according to this embodiment. The flicker reducing section 200 includes a line integral value getting section 210, a line integral value memory 220, an inter-image DFT section 230, a flicker detecting section 240, a linear approximation section 250, a flicker coefficient calculating section 260, and a correction arithmetic section 270. The line integral value getting section 210 includes a line integration section 211 and a sampling section 212, which includes a counter 213.

The respective elements of this flicker reducing section 200 may be implemented as hardware components. For example, if the flicker reducing section 200 is an application specific integrated circuit (ASIC) chip which was specially designed and produced for the image capture device 100, the respective elements may be implemented as independent integrated circuits within the flicker reducing section 200.

Alternatively, the flicker reducing section 200 may also be implemented as a general-purpose processor which can perform the functions of the respective elements. For example, a computer program which is defined to get the functions of the respective elements performed may be installed in a memory built in the processor, and the functions of those elements may be performed by making the processor execute that computer program sequentially. Still alternatively, the flicker reducing section 200 may also be implemented as a combination of hardware components and a software program as well.

Next, it will be described briefly with reference to FIG. 1 again how this image capture device 100 operates.

The image sensor 102 converts the light that has been imaged onto the image capturing plane by the image optical system 101 into an electrical signal, thereby generating an analog image signal. The AFE section 104 performs various kinds of analog signal processing on the analog image signal supplied from the image sensor 102 to convert the processed analog image signal into a digital image signal. The flicker reducing section 200 of the digital signal processing section 107 reduces the flicker component that has been produced in the digital image signal supplied from the AFE section 104. The signal processing section 108 subjects the digital image signal supplied from the flicker reducing section 200 to various kinds of processing including gamma correction, white balance correction, flaw correction, and image format conversion compliant with the output image form. The compression coding section 109 compresses the digital image signal supplied from the signal processing section 108 in a compression format compliant with the H. 264 standard or the MPEG-2 standard, for example, thereby turning it into a compressed image file. Finally, the controller 103 writes the compressed image file on the storage medium 110.

[Operation of Flicker Reducing Section 200]

Next, it will be described with reference to FIGS. 2 through 5 exactly how the flicker reducing section 200 operates.

Figure 3:
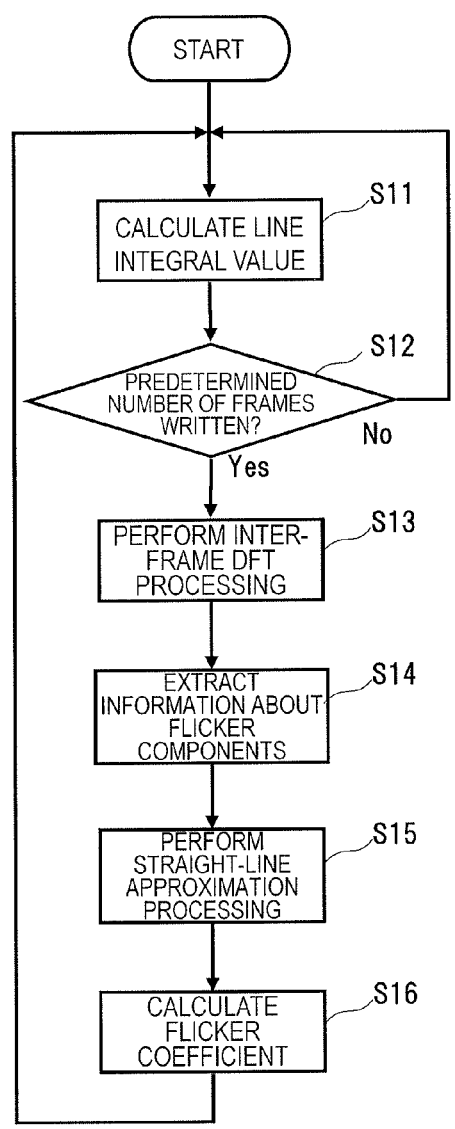
FIG. 3 is a flowchart showing the procedure of operation of the flicker reducing section 200 according to the first exemplary embodiment.

FIG. 3 is a flowchart showing the procedure of operation of the flicker reducing section 200.

(Step S11)

The line integral value getting section 210 includes the line integration section 211 and the sampling section 212. The line integral value getting section 210 gets, based on values of pixels included in ones selected from a plurality of horizontal lines that form a frame, line integral values of the selected horizontal lines with respect to each frame. The "pixel values" mean the luminance values of pixels. For example, at a frame size of 1280×720 pixels, 720 horizontal lines correspond to the plurality of horizontal lines that form the frame.

The line integration section 211 calculates a line integral value with respect to each of the plurality of horizontal lines. For example, at a frame size of 1280×720 pixels, a single horizontal line includes 1280 pixels. Thus, with respect to each horizontal line, the line integration section 211 calculates the integral of the respective pixel values of those 1280 pixels, thereby regarding the integral value thus obtained as a line integral value (which will be sometimes hereinafter referred to as a "first integral value"). The line integration section 211 may calculate the average value of the line integral values by dividing (i.e., normalizing) the first integral value by the number of pixels that are included in one horizontal line. Alternatively, the line integration section 211 may also obtain a line integral value by calculating the integral of the luminance values of only pixels that satisfy a predetermined condition in one horizontal line (such an integral value will be sometimes hereinafter referred to as a "second integral value"). Still alternatively, the line integration section 211 may normalize the second integral value by dividing the second integral value by the number of pixels that satisfy a predetermined condition.

The terms to be used in this description will now be defined. The "line integral value" includes not only the first line integral value described above but also the second line integral value and a value obtained by normalizing the first and second line integral values by the number of pixels as well.

If a luminance value is expressed in 12 bits, the "predetermined condition" may be that the luminance value of a pixel fall within the range of the lower limit of 204 to the upper limit of 3481. By setting the luminance value of a pixel to be equal to or greater than the lower limit, pixels which do not have a good SNR (signal to noise ratio) can be removed. And by setting the luminance value of a pixel to be equal to or smaller than the upper limit, pixels which could be saturated can be removed. Since such factors that would cause a decrease in the accuracy of extracting flicker components can be removed in this manner, information about the flicker frequency, phase and amplitude can be detected more accurately.

The "predetermined condition" does not have to be such a condition but may also be any other condition as long as horizontal lines that would have harmful effects can be removed in extracting flicker components.

The sampling section 212 selects a line integral value with a good condition from the line integral values obtained from the line integration section 211. Specifically, the sampling section 212 extracts first samples from outputs of the line integration section 211 in the descending order of the number of pixels, of which the pixel values satisfy a predetermined condition, so that the first samples have a larger number of such pixels than any other samples. Then, the sampling section 212 defines horizontal lines associated with the first samples to be ones selected from those horizontal lines. The "predetermined condition" may be the range of luminance values as described above, for example.

Figure 4:
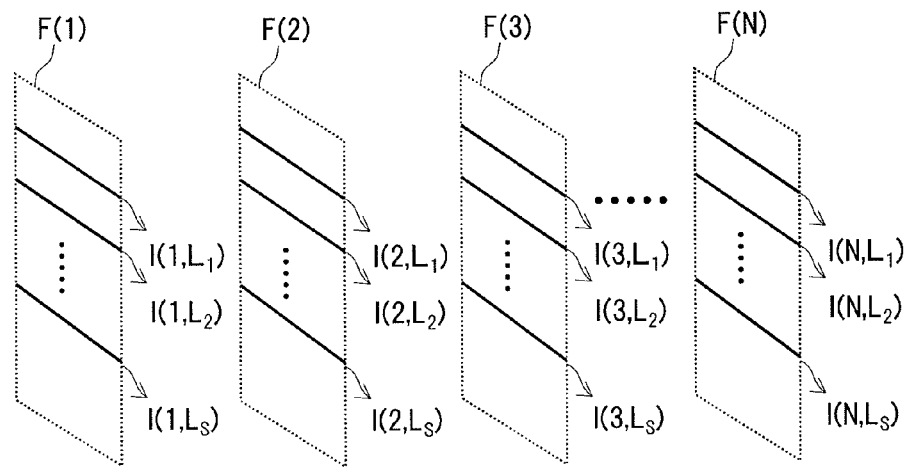
FIG. 4 schematically illustrates line integral values obtained from horizontal lines, of which the vertical coordinates remain the same between N frames.

FIG. 4 schematically illustrates line integral values obtained from horizontal lines, of which the vertical coordinates remain the same between N frames. In this description, the "vertical coordinate" refers herein to the coordinate position of a horizontal line in the vertical direction within a frame. For example, if the frame size is 1280×720, the vertical coordinate of the uppermost horizontal line within the frame may be represented as "0" and the vertical coordinate of the lowermost horizontal line within the frame may be represented as "719". In FIG. 4, F(1), F(2), F(3), . . . and F(N) indicate Frames #1 through #N, respectively, where N is the predetermined number of frames that need to be used to get the flicker reduction processing done. The number N of frames may be set to be twelve, for example. In this description, the predetermined number of frames (or frame period) will be hereinafter referred to as an "analysis unit". As described above, the analysis unit is determined based on the greatest common divisor between the flicker frequency and the frame rate.

F(n) indicates the frame number. If n=1, 2, 3, . . . and N, then $I(n, L_1), I(n, L_2), \ldots$ and $I(n, L_s)$ represent the respective line integral values of the frame F(n) which are obtained by making the sampling section 212 extract the line integral values of S lines as samples from the outputs of the line integration section 211. In $I(n, L_s)$, n indicates the frame number, s (where $1 \leq s \leq S$) indicates the selected line number of the sample horizontal line, and $L_s$ indicates the vertical coordinate of a horizontal line with the selected line number s. Suppose a situation where the frame size is 1280×720 and the vertical coordinates of the sample horizontal lines are 100, 110 and 115, respectively. In that case, selected line #1 is assigned to the horizontal line with a vertical coordinate of 100, selected line #2 is assigned to the horizontal line with a vertical coordinate of 110, and selected line #3 is assigned to the horizontal line with a vertical coordinate of 115.

S indicating the number of sample horizontal lines is smaller than the total number of horizontal lines that form a frame. A set of line integral values with the same selected line number indicate the line integral values of horizontal lines which are located at the same vertical coordinate in multiple frames. For example, $I(1, L_1), I(2, L_1)$, and $I(3, L_1)$ indicate the line integral values of the horizontal lines located at the same vertical coordinate in Frames #1 to #3. For instance, at a frame size of 1280×720, the number S of sample horizontal lines becomes smaller than 720. If the number S of first samples is set to be 50, the relation $1 \leq s \leq 50$ is satisfied. The number S of first samples is appropriately determined by the specification of the product, for example. The numbers S of the first samples and the second sample (to be described later) are suitably equal to or greater than three.

The sampling section 212 includes the counter 213, which counts the number of pixel values that satisfy the predetermined condition described above on a single horizontal line.

An example in which the sampling section 212 gets the line integral values of S sample lines in two stages will be described. First of all, the sampling section 212 takes first samples based on the lower limit value under the predetermined condition described above. Specifically, the counter 213 counts the number of pixel values which are equal to or greater than the lower limit value. The sampling section 212 extracts, as first sample candidates, line integral values associated with horizontal lines on which the counts of the counter 213 are equal to or greater than the threshold value. In this manner, line integral values associated with horizontal lines including pixels that do not have a good SNR can be removed.

The sampling section 212 chooses first samples from those first sample candidates in the descending order of the number of pixels, of which the pixel values are equal to or greater than the lower limit value, so that the first samples have a larger number of such pixels than any other samples. For example, if the number S1 of first samples has been set in advance to be 50, line integral values associated with 80 horizontal lines may be extracted as the first sample candidates. In that case, the sampling section 212 extracts 50 out of those 80 first sample candidates in the descending order of the number of pixels, of which the pixel values are equal to or greater than the lower limit value, and defines horizontal lines associated with the first samples as selected horizontal lines. In this case, the selected line number s satisfies the relation 1≤s≤50. Those selected ones of the plurality of horizontal lines will be subjected to a discrete Fourier transform (which will be hereinafter referred to as "DFT") by the inter-image DFT section 230 as will be described later.

In accordance with the relation between the count of the counter 213 and the threshold value stored in an internal memory (not shown), the sampling section 212 may further extract second samples from the first samples and may define the horizontal lines associated with those second samples to be the selected horizontal lines.

The sampling section 212 further extracts second samples from the first samples based on the upper limit value of the predetermined condition described above. Specifically, the counter 213 counts the number of pixels, of which the pixel values are equal to or smaller than the upper limit value, on each of the horizontal lines that are the first samples. And the sampling section 212 extracts, as second sample candidates, line integral values associated with horizontal lines on which the count of the counter 213 is equal to or greater than a threshold value. In this manner, line integral values associated with horizontal lines including pixels that do not have a good SNR and pixels that might be saturated can be removed.

The sampling section 212 chooses second samples from those second sample candidates in the descending order of the number of pixels, of which the pixel values are equal to or smaller than the upper limit value, so that the second samples have a larger number of such pixels than any other samples. For example, if the number S2 of second samples has been set in advance to be 20, line integral values associated with 30 horizontal lines may be extracted as the second sample candidates. In that case, the sampling section 212 extracts 20 out of those 30 second sample candidates in the descending order of the number of pixels, of which the pixel values are equal to or smaller than the upper limit value, and defines horizontal lines associated with the second samples as selected horizontal lines. In this case, the selected line number s satisfies the relation 1≤s≤20. Those selected ones of the plurality of horizontal lines will be subjected to DFT by the inter-image DFT section 230 as will be described later.

As can be seen from the foregoing description, the sampling section 212 extracts samples based on a predetermined condition. As a result, horizontal lines which would have harmful effects on flicker detection can be eliminated perfectly, and therefore, the flicker components can be detected more accurately.

Optionally, the sampling section 212 may further extract second samples from the first samples based on a motion vector between frames and may define horizontal lines associated with those second samples as the selected ones of the horizontal lines. In that case, sample horizontal lines can be determined with the motion between frames taken into account on a macroblock basis, for example. As a result, flicker can be detected even more accurately.

If the newest frame is F(N), the sampling section 212 writes the respective line integral values that have been obtained from the selected line number s of the frames F(1) through F(N−1) earlier than the newest one in the line integral value memory 220. Alternatively, the sampling section 212 may write the respective line integral values associated with the selected line number s into the line integral value memory 220 on the analysis unit of F(1) through F(N).

As can be seen, the line integral value memory 220 does not have to store the line integral value of every one of the horizontal lines that form one frame, and does not have to select samples densely (e.g., at equal intervals), either, from all of those horizontal lines that form an image. That is why the line integral value memory 220 just needs to have a capacity which is large enough to store as many line integral values as the number S of samples. As a result, the memory size can be reduced.

(Step S12)

The flicker reducing section 200 includes a controller (not shown) which controls the flicker reducing section 200 in its entirety. The controller sees if as many line integral values as the predetermined number of frames have been written into the line integral value memory 220 yet. As described above, the predetermined number of frames is either N−1 or analysis unit. If the decision has been made that as many line integral values as the predetermined number of frames have not been written yet (i.e., if the answer to the query of the processing step S12 is NO), then the line integral value getting section 210 calculates the line integral value of the next frame over and over again until as many line integral values as the predetermined number of frames are written into the line integral value memory 220.

On the other hand, if the decision has been made by the controller that as many line integral values as the predetermined number of frames have been written (i.e., if the answer to the query of the processing step S12 is YES), then the next DFT processing step S13 is performed.

(Step S13)

The inter-image DFT section 230 retrieves the respective line integral values associated with the selected line number s of frames F(1) through F(N−1) from the line integral value memory 220, and then performs a DFT using the line integral values associated with the selected line number s and retrieved from the line integral value memory 220 and the line integral value of a frame F(N). Specifically, the inter-image DFT section 230 performs a DFT on a sequence of line integral values which is comprised of line integral values I (1, $L_s$), I (2, $L_s$), . . . and I (N, $L_s$) that are associated with the selected line number s (where 1≤s≤S).

If the respective line integral values have been written into the line integral value memory 220 at an analysis unit of frames F(1) through F(N), then the inter-image DFT section 230 may perform a DFT by retrieving a sequence of line integral values from the line integral value memory 220.

Portion (a) of FIG. 5 illustrates how a DFT is performed on a sequence of line integral values associated with each selected line number. In the example illustrated in portion (a) of FIG. 5, the number S of samples is five. The inter-image DFT section 230 performs a DFT on each sequence of line integral values, comprised of line integral values associated with the same selected line number s, on a selected line number basis between the newest frame F(N) and a number of other frames F(1) through F(N−1) that have been obtained earlier than the newest one.

The DFT is represented by the following Equation (1) using the number N of frames and the vertical coordinate y of a horizontal line in a frame:

$$F(y, k) = \sum_{j=0}^{N-1} I(y, j)e^{-2\pi i \frac{j*k}{N}} \equiv A_k(y)e^{id_k(y)} \quad (1)$$

where I (y, j) represents a line integral value associated a horizontal line with a vertical coordinate y in a frame F(j). By performing this DFT, an amplitude $A_k(y)$ and a phase $\phi_k(y)$ are obtained.

The inter-image DFT section 230 may estimate a candidate frequency at which flicker possibly occurs based on the frequency of a grid power and the frame rate and may perform the DFT on the sequence of line integral values using the candidate frequency.

In that case, the inter-image DFT section 230 just needs to obtain a Fourier transform coefficient at a position corresponding to neighboring frequencies including that estimated frequency, and the computational load on the inter-image DFT section 230 can be lightened. In addition, the DFT arithmetic operation can be speeded up, too.

(Step S14)

The flicker detecting section 240 determines, based on the result of the DFT that has been performed by the inter-image DFT section 230, whether or not there is any flicker in the image signal. Specifically, the flicker detecting section 240 refers to a Fourier transform coefficient (DFT coefficient) at which flicker occurs. Based on the magnitude of the Fourier transform coefficient that is its complex number, the flicker detecting section 240 calculates the amplitude of the flicker at the position where the flicker component appears (i.e., at the candidate flicker frequency).

Portion (b) of FIG. 5 shows an exemplary frequency-amplitude characteristic obtained through DFT when the frame rate is 120 fps and the flicker frequency is 100 Hz. In portion (b) of FIG. 5, the abscissa represents the frequency and the ordinate represents the amplitude. In accordance with the relation between the frame rate and the flicker frequency, aliasing occurs at a Nyquist frequency (of 60 Hz) and the flicker frequency appears at a position of 20 Hz. The flicker detecting section 240 calculates the amplitude of the flicker at that position corresponding to a frequency of 20 Hz with respect to each horizontal line that is a sample for the sampling section 212.

The flicker's amplitude is a value which is proportional to an image signal component of a horizontal line in question. That is why the flicker detecting section 240 calculates as many normalized amplitudes (i.e., the amplitudes of flicker) as the number S of samples by normalizing the amplitude of the flicker by the DC component of the image. And the flicker detecting section 240 obtains a representative value from these normalized amplitudes. The representative value may be either the average of the normalized amplitudes or the median or mode of the normalized amplitudes.

If the representative value is equal to or greater than a predetermined value, the flicker detecting section 240 decides that there be flicker in the image signal. On the other hand, if the representative value is less than the predetermined value, the flicker detecting section 240 transmits an instruction to stop the flicker reduction processing to the correction arithmetic section 270 on the next stage.

(Step S15)

The linear approximation section 250 obtains an approximation line based on phase (argument) information that has been collected as a result of the DFT and extracts flicker information from the approximation line. Specifically, the linear approximation section 250 refers to a Fourier transform coefficient at which flicker component appears. Based on the argument of the Fourier transform coefficient that is its complex number, the linear approximation section 250 calculates the phase of the flicker at the position where the flicker component appears.

Portion (c) of FIG. 5 shows a relation between the argument of the DFT coefficient at the frequency (of 20 Hz) at which the flicker occurs and the vertical coordinate of a horizontal line in a frame. In portion (c) of FIG. 5, the abscissa represents the vertical coordinate of a horizontal line in a frame and the ordinate represents the argument (phase).

If the vertical coordinates of horizontal lines with the selected line number s and phases are plotted, the S plot points, which are as many as the number of samples, are ideally arranged in line. The linear approximation section 250 obtains the gradient a and intercept b of the approximation line (i.e., regression line) based on these S coordinate points. To obtain the regression line, the number of plot points between the vertical coordinates and the phases may be two. Considering the accuracy of linear approximation, however, the number of plot points is suitably three or more.

The linear approximation section 250 calculates a flicker initial phase θ and a flicker frequency $f_k$ by the following Equations (2) using the gradient a and the intercept b:

$$\theta = b$$
$$f_k = \frac{f_s * L_N}{2\pi} * a \qquad (2)$$

where $f_s$ represents the frame rate and $L_N$ represents the number of lines in a frame including the blanking interval.

As indicated by Equations (2), the intercept b of the ordinate of the approximation line represents the phase of the flicker component at a vertical coordinate y=0. This phase is defined herein to be the initial phase. Also, the flicker frequency $f_k$ can be calculated based on the gradient a of the approximation line.

As can be seen, the flicker frequency and initial phase can be obtained more accurately by linear approximation using the phase information that has been collected as a result of the DFT. As a result, flicker can be detected more accurately.

(Step S16)

The flicker coefficient calculating section 260 calculates a flicker coefficient for use to perform flicker reduction processing based on the flicker's initial phase and frequency (i.e., by reference to flicker information). Specifically, the flicker coefficient calculating section 260 gets a representative value of the normalized amplitude from the flicker detecting section 240 and gets the flicker's initial phase and frequency from the linear approximation section 250. If the flicker detecting section 240 has decided that there be flicker in the image signal, the flicker coefficient calculating section 260 generates a flicker coefficient associated with each horizontal line in the newest (i.e., current) frame to be input to the flicker reducing section 200 based on the representative value of the normalized amplitude and the flicker's initial phase and frequency.

The correction arithmetic section 270 performs flicker reduction processing on the image signal using the flicker coefficient that has been obtained by the flicker coefficient calculating section 260. Specifically, the correction arithmetic section 270 divides the value of each pixel on a horizontal line by the flicker coefficient associated with that horizontal line plus one, thereby obtaining a pixel corrected value, from which the flicker component has been reduced, from each pixel value. Also, on receiving an instruction to stop the flicker reduction processing from the flicker detecting section 240, the correction arithmetic section 270 stops performing the flicker reduction processing. As a result, the power dissipated by the flicker reducing section 200 can be cut down.

An exemplary timing when the flicker coefficient is updated by the flicker coefficient calculating section 260 will be described.

The flicker coefficient is updated at a predetermined timing, which may be, for example, every 12 frames that form an analysis unit. The flicker coefficient calculating section 260 calculates Flicker Coefficient A based on the first twelve frames (i.e., Frames #1 through #12), which form part of a series of frames representing a moving picture stream. On the next twelve frames (i.e., Frames #13 through #24), the correction arithmetic section 270 performs processing of relieving the image signal to be input to the flicker reducing section 200 of flicker using Flicker Coefficient A. In the meantime, Flicker Coefficient B is calculated based on those Frames #13 through #24. On the next twelve frames (i.e., Frames #25 through #36), the correction section 270 performs processing of relieving the image signal to be input to the flicker reducing section 200 of flicker using Flicker Coefficient B. In the meantime, Flicker Coefficient C is calculated based on those Frames #25 through #36.

Even if a shooting session needs to be carried out using a greater number of frames as in performing a high frame rate shooting session, the flicker reducing section 200 of this embodiment just needs to store as many line integral values as the number S of samples into a memory between predetermined frames. As a result, a memory of a relatively small size can be used, and therefore, the memory cost can be cut down. In addition, since the linear approximation section 250 can detect the flicker's frequency and initial phase more accurately, the flicker detection accuracy can be further improved.

OTHER MODIFIED EXAMPLES

In the first embodiment described above, the device including the flicker reducing section 200 is supposed to be an image capture device. However, this is just an example of an aspect of the present invention. Alternatively, the device including the flicker reducing section 200 may also be a recorder.

Also, in the first embodiment, the image sensor 102 is supposed to be a CMOS sensor. However, this is just an example of an aspect of the present invention. Alternatively, the image sensor 102 may also be a CCD (charge-coupled device) sensor, which is a global shuttering image sensor and which can reduce flicker to be produced between frames due to global shuttering.

Furthermore, in the first embodiment described above, an input image supplied to the flicker reducing section 200 is a digital image signal that has been output from the AFE section 104. This digital image signal is RAW data and may have a width of 12 bits, for example. However, this is just an example of an aspect of the present invention. Alternatively, the input image supplied to the flicker reducing section 200 may also be compressed image data which has been compressed compliant with the H. 264 standard, for example. The compressed image data may be a signal with a width of 8 bits, for example. As the bit width of the compressed image data is narrower than that of RAW data, the flicker detection accuracy somewhat decreases but the flicker can be reduced from the compressed image data anyway. Nevertheless, the compressed image data has been subjected to gamma correction processing by the signal processing section 108. That is why when the flicker reducing section 200 processes the compressed image data, the compressed image data that is incoming data should be subjected to inverse gamma correction processing in advance.

If the flicker reducing section 200 processes compressed image data, as aspect of the present invention is also applicable to a computer program to be installed into a memory on a cloud server.

The user of the cloud server uploads compressed image data (moving picture data) to the cloud server. In response, the computer of the cloud server executes a computer program installed in its memory, thereby removing flicker components from the moving picture data with the flicker components. By downloading the moving picture data thus processed, the user can get moving picture data from which the flicker components have been removed.

An aspect of the present invention is also applicable to software (computer program) which defines the flicker reduction processing of the first embodiment described above. The operation defined by such a computer program may be as shown in FIG. 5, for example. Such a computer program may be not only circulated by being recorded on a removable storage medium but also downloaded through telecommunications lines as well. If a processor built in a computer executes such a computer program, the various operations that have already been described for the first embodiment can be carried out.

INDUSTRIAL APPLICABILITY

An image capture device according to an aspect of the present invention can be used effectively to reduce flicker which has been produced as bright and dark portions from an image signal representing an image shot in the image shot due to illumination's flickering. The image capture device can be used particularly effectively in a digital camcorder or digital still camera which captures an image using an image sensor of a line exposure type.

REFERENCE SIGNS LIST

100 image capture device
101 image optical system
102 image sensor
103 controller
104 AFE section
105 optical system driver
106 sensor control section
107 digital signal processing section
108 signal processing section
109 compression coding section
110 storage medium
200 flicker reducing section
210 line integral value getting section
211 line integration section
212 sampling section
213 counter
220 line integral value memory
230 inter-image DFT section
240 flicker detecting section
250 linear approximation section
260 flicker coefficient calculating section
270 correction arithmetic section

The invention claimed is:
1. A flicker reducing apparatus which reduces flicker caused by illumination from an image signal which has been generated by an image sensor and which has the flicker, the apparatus comprising:
a line integral value getting section which gets, based on values of pixels included in ones selected from a plural- ity of horizontal lines that form an image, line integral values of the selected horizontal lines with respect to each image;

a discrete Fourier transform section which performs, between the newest image and a number of other images gotten earlier than the newest image, a discrete Fourier transform on a sequence of the line integral values of the respective images;

a linear approximation section which obtains an approximation line based on phase information that has been collected as a result of the discrete Fourier transform and which extracts information about the flicker from the approximation line;

a flicker coefficient calculating section which calculates a flicker coefficient by reference to the flicker information; and a correction arithmetic section which performs flicker reduction processing on the image signal using the flicker coefficient.

2. The flicker reducing apparatus of claim 1, wherein the line integral value getting region includes:

a line integration section which calculates, with respect to each image, the line integral value of each of the plurality of horizontal lines that form the image; and a sampling section which extracts first samples from outputs of the line integration section in the descending order of the number of pixels, of which the pixel values satisfy a predetermined condition, so that the first samples have a larger number of such pixels than any other samples and which defines horizontal lines associated with the first samples to be the ones selected from those horizontal lines.

3. The flicker reducing apparatus of claim 2, wherein the line integral value is either an integral value which is calculated by integrating all pixel values included in each said horizontal line or pixel values that satisfy the predetermined condition or a normalized value which is calculated by normalizing the integral value by the number of pixels included in the horizontal line or the number of pixels, of which the pixel values satisfy the predetermined condition.

4. The flicker reducing apparatus of claim 3, wherein the sampling section includes a counter which counts the number of pixel values that satisfy the predetermined condition, further extracts second samples from the first samples according to a relation between the counter's count and a threshold value, and defines horizontal lines associated with the second samples to be the one selected from the plurality of horizontal lines, and the linear approximation section extracts the flicker information from the horizontal lines associated with the second samples.

5. The flicker reducing apparatus of claim 3, wherein the sampling section further extracts second samples from the first samples according to a motion vector between the images, and defines horizontal lines associated with the second samples to be the one selected from the plurality of horizontal lines, and the linear approximation section extracts the flicker information from the horizontal lines associated with the second samples.

6. The flicker reducing apparatus of claim 1, wherein the discrete Fourier transform section estimates a candidate frequency at which flicker possibly occurs based on the frequency of a grid power and the frame rate of the image and performs the discrete Fourier transform on the sequence of line integral values using the candidate frequency.

7. The flicker reducing apparatus of claim 6, further comprising a flicker detecting section which determines, based on a result of the discrete Fourier transform, whether or not there is any flicker in the image signal, wherein the flicker detecting section is configured to:

calculate the amplitude at the candidate frequency by reference to amplitude information collected as a result of the discrete Fourier transform;

calculate normalized amplitude by dividing the amplitude at the candidate frequency by the amplitude of a DC component of the image; and determine a representative value based on the normalized amplitude associated with the sequence of line integral values, and decide that there be the flicker if the representative value is equal to or greater than a predetermined value or transmit an instruction to stop the flicker reduction processing to the correction arithmetic section if the representative value is less than the predetermined value.

8. The flicker reducing apparatus of claim 1, wherein the linear approximation section detects an intercept of the approximation line as the flicker's initial phase, and detects the flicker's frequency based on the gradient of the approximation line.

9. The flicker reducing apparatus of claim 1, further comprising a memory which stores the line integral values of multiple images.

10. An image capture device which reduces flicker caused by illumination from an image signal, the device comprising:

an image sensor which captures a subject image and generates the image signal;

a line integral value getting section which gets, based on values of pixels included in ones selected from a plurality of horizontal lines that form an image, line integral values of the selected horizontal lines with respect to each image;

a memory which stores the line integral values of multiple images;

a discrete Fourier transform section which performs, between the newest image and a number of other images gotten earlier than the newest image, a discrete Fourier transform on a sequence of the line integral values of the respective images;

a linear approximation section which obtains an approximation line based on phase information that has been collected as a result of the discrete Fourier transform and which extracts information about the flicker from the approximation line;

a flicker coefficient calculating section which calculates a flicker coefficient by reference to the flicker information; and a correction arithmetic section which performs flicker reduction processing on the image signal using the flicker coefficient.

11. A flicker reducing method for reducing flicker caused by illumination from an image signal which has been generated by an image sensor and which has the flicker, the method comprising the steps of:

getting, based on values of pixels included in ones selected from a plurality of horizontal lines that form an image, line integral values of the selected horizontal lines with respect to each image;

performing, between the newest image and a number of other images gotten earlier than the newest image, a discrete Fourier transform on a sequence of the line integral values of the respective images;

obtaining an approximation line based on phase information that has been collected as a result of the discrete Fourier transform and extracting information about the flicker from the approximation line;

calculating a flicker coefficient by reference to the flicker information; and performing flicker reduction processing on the image signal using the flicker coefficient.

\* \* \* \* \*